United States Patent [19]

Lawrence

[11] 4,067,158
[45] Jan. 10, 1978

[54] TOWING A-FRAME STRUCTURE FOR PREFABRICATED BUILDING

[76] Inventor: Robert Raymond Lawrence, 205 W. Fifth St., Alturas, Calif. 96101

[21] Appl. No.: 722,884

[22] Filed: Sept. 13, 1976

[51] Int. Cl.² ................................. E04B 1/343
[52] U.S. Cl. ........................ 52/143; 280/81 R; 280/404
[58] Field of Search ............. 52/143, 79.7, 79.8; 280/30, 404, 81 R

[56] References Cited

U.S. PATENT DOCUMENTS

| 2,287,229 | 6/1942 | Carpenter | 52/79.8 |
|---|---|---|---|
| 3,254,914 | 6/1966 | Steck | 280/81 R X |
| 3,697,098 | 10/1972 | Fisher | 52/143 |
| 3,765,714 | 10/1973 | Lau | 52/143 X |
| 3,834,111 | 9/1974 | Acker et al. | 52/143 X |
| 3,944,242 | 3/1976 | Eubank | 52/143 X |

FOREIGN PATENT DOCUMENTS 405,949  7/1966  Switzerland .................. 280/30

*Primary Examiner*—Alfred C. Perham

[57] ABSTRACT

A metal "A" frame structure capable, upon attachment, of towing a prefabricated building of, primarily, conventional frame construction. Metal "A" frame utilizes two identical leg members which attach to load distributing members that transmit the relatively heavy concentrated loads into the sides and front of the prefabricated building without introducing over stress. Interconnection of the various metal parts of the "A" frame is selectively accomplished by welding and bolting so that the "A" frame may be easily installed, removed and stored when not in use. The load distributing members which deliver the concentrated loads into the prefabricated building "box" may be adjusted in height, in the case of the front wall of the side walls in order to apply the loads at at the most structurally advantageous locations on the "box".

1 Claim, 5 Drawing Figures

TOWING A-FRAME STRUCTURE FOR PREFABRICATED BUILDING

Prior to this invention, towing of prefabricated buildings over the highway was of two categories i.e. that associated with mobile homes and that associated with modular homes. Mobile home towing gas was accomplished with an "A" frame which was an integral part of a steel chassis on which the mobile home was constructed. Modular building towing was undertaken byy placing the prefabricated building box on a heavy flat trailer which had a towing "A" frame or tongue incorporated in its design. Two other patent applications are as follows 1. Ser. No. 722,882, filed Sept. 13, 1976. Prefabricated Transportable Building Without Continuous Steel Chassis and 2. Ser. No. 722,883, filed Sept. 13, 1976 Removable Low Level Building Carrier. These latter patent applications originate a transportable prefabricated building which is devoid of a continuous steel chassis but which does not require a heavy flat trailer for transportation. Under this concept the superstructure of the prefabricated building e.g. exterior walls, ridge beam, etc. are utilized to provide necessary strength to permit elimination of the continuous steel chassis but yet allow safe transport of the building. This invention provides an "A" frame structure which is especially adaptable to the latter mentioned prefabricated building e.g. one designed to withstand over the road stresses but without use of a complete or continuous steel chassis and not requiring use of heavy trailer such as is customarily used for modular building transport.

For the purpose of illustrating the invention there is shown in the drawings a form which is presently preferred; it being understood, however, that this invention is not limited to the precise arrangements and instrumentalities shown.

DETAILED DESCRIPTION

Figure 1:
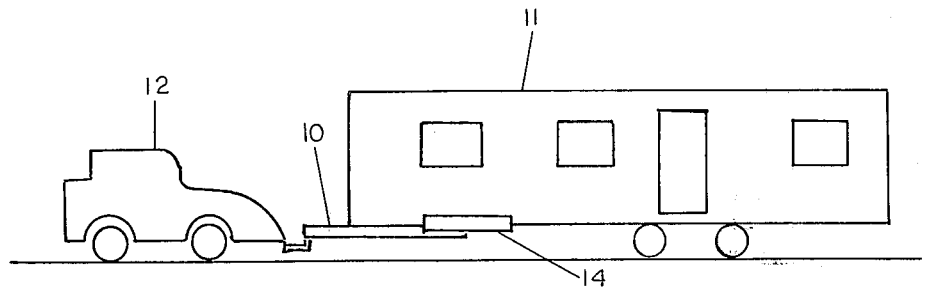
FIG. 1 is a side elevation view of a prefabricated building and towing vehicle
Figure 2:
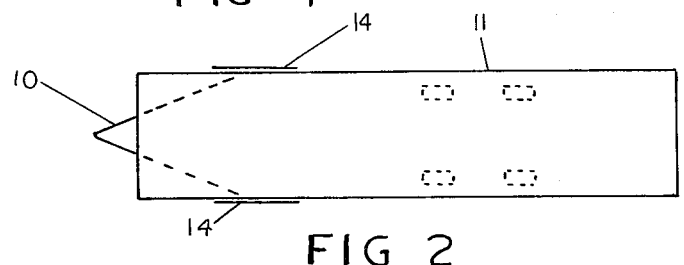
FIG. 2 is a plan view of a prefabricated building
Figure 3:
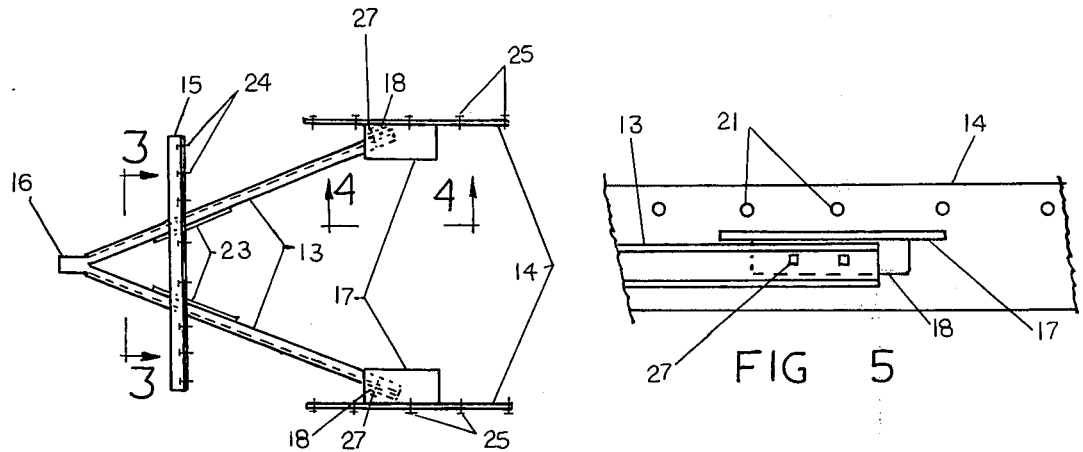
FIG. 3 is a plan view of the towing "A" frame structure
Figure 5:
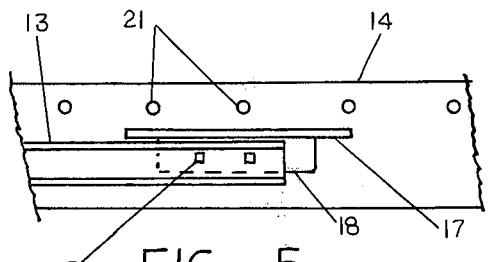
FIG. 5 is a fragmentary side elevation taken along line 4—4 in FIG. 3
Figure 4:
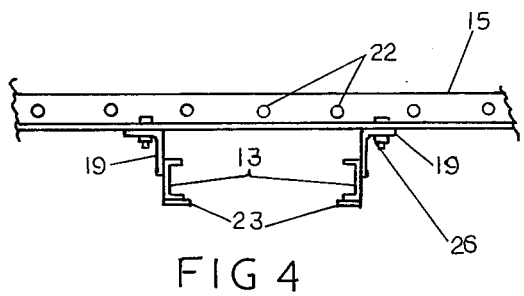
FIG. 4 is a fragmentary front elevation taken along line 3—3 in FIG. 3

Referring to the drawings, a preferred embodiment of this invention is illustrated which, in general, involves a specially designed "A" frame structure 10 to permit towing prefabricated building 11 by towing vehicle 12. "A" frame 10 comprises two identical leg members 13 interconnected in an angular alignment relative to one another. This interconnection is accomplished at the apex where each member 13 connects to trailer hitch coupler 16 by means of bolts, rivets or welding. At the end of each of the "A" frame legs 13, each leg is connected to vertical gusset plate 18 by means of bolts 27. Vertical gusset plates 18 are welded to horizontal gusset plates 17 by welding and gussets 17 are weld connected to side load distribution plates 14. At an intermediate point along the length of leg members 13 said members are connected to height adjusting brackets 19 by welding, bolts, rivets or the equivalent. Brackets 19 are connected to front load distributing member 15 by bolts 20 or by rivets or welding or equal. Side load distributing plate 14 is attached to the prefabricated building sides by lag bolts, screws or bolts 25 through holes 21. The precise vertical location level of these latter connecters may be adjusted by varying the width of side load distributing plates 14 so that the structurally advantageous location on the prefabricated building 11 of these fasteners may be utilized. Front load distributing member 15 is attached to the front wall of the prefabricated building by lag bolts screws or bolts placed in holes 22. The precise location of these fasteners may be adjusted vertically by varying the length of brackets 19. All above members are sized according to the magnitude of loads to be towed and members 13 may be reinforced at points of excessive bending moment by welding attachment of plates 23. Ease of installation is accomplished by bolted connection of leg members 13 to coupler 16 and gusset member 18.

Although a preferred embodiment of this invention has been shown and described, this invention is not meant to be limited thereto but is intended to embody all forms and modifications within the spirit of the following claims.

I claim:

1. In combination, a prefabricated building and a towing "A" frame structure comprising
   a. a prefabricated building having an elongated body and which is structurally suitable for being towed by means of said towing "A" frame along a line parallel to the longitudinal axis of said building,
   b. a towing "A" frame structure attached to said building at the forward end of said building, said "A" frame comprising,
      1. two longitudinally elongated leg members lying in the same horizontal plane and lying at an angle relative to one another,
      2. a front load distributing member, horizontally disposed lying perpendicular to the longitudinal axis of said prefabricated building,
      3. two identical load distributing side plates of rectangular shape lying in a vertical plane, parallel to each other and separated by a distance substantially equal to the width of the prefabricated building.
      4. means connecting said leg members to load distributing side plates said means being by attaching said leg members to vertical gusset plates by bolts and connecting said vertical gusset plates to horizontal gusset plates by welding and connecting said horizontal gusset plates to said load distributing side plates by welding.
      5. means connecting leg members together at their apex said means being by bolting, welding or riveting said leg members to a trailer hitch coupler,
      6. means connecting load distributing front member to said leg members said means being by connecting said leg members to height adjusting brackets by bolts, rivets or welding and connecting said brackets to said load distributing front member by bolts at two locations along the length of said load distributing front member,
      7. means connecting load distributing front member to prefabricated building, said means being by connecting said load distributing front member to prefabricated building by lag bolts, screws or bolts,
      8. means connecting load distributing side members to prefabricated building, said means being by connecting said load distributing side members to prefabricated building by lag bolts, screws or bolts.

* * * * *